US010298353B2

(12) United States Patent
Lee et al.

(10) Patent No.: US 10,298,353 B2
(45) Date of Patent: May 21, 2019

(54) METHOD AND DEVICE FOR RECEIVING UPLINK SIGNAL USING DIFFERENTIAL MODULATION SCHEME WITH INTERFERENCE CANCELLATION AND CHANNEL ESTIMATION

(71) Applicant: LG ELECTRONICS INC., Seoul (KR)

(72) Inventors: Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/699,511

(22) Filed: Sep. 8, 2017

(65) Prior Publication Data

US 2018/0227069 A1   Aug. 9, 2018

Related U.S. Application Data

(60) Provisional application No. 62/457,110, filed on Feb. 9, 2017.

(51) Int. Cl.

| H04W 74/08 | (2009.01) |
|---|---|
| H04W 24/02 | (2009.01) |
| H04J 11/00 | (2006.01) |
| H04L 25/02 | (2006.01) |
| H04W 76/27 | (2018.01) |
| H04L 5/00 | (2006.01) |
| H04L 25/03 | (2006.01) |
| H04L 27/20 | (2006.01) |
| H04W 72/04 | (2009.01) |

(52) U.S. Cl.
CPC .......... *H04J 11/0023* (2013.01); *H04L 5/005* (2013.01); *H04L 25/0202* (2013.01); *H04L 25/0236* (2013.01); *H04L 25/03* (2013.01); *H04L 27/205* (2013.01); *H04W 74/0833* (2013.01); *H04W 76/27* (2018.02); *H04L 5/0007* (2013.01); *H04W 72/0406* (2013.01)

(58) Field of Classification Search
CPC ......... H04W 72/1226; H04W 74/0833; H04W 88/12; H04W 24/02; H04W 72/0406; H04W 76/27; H04J 11/0023; H04L 25/0202; H04L 5/0007
USPC .......................................... 455/450; 370/329
See application file for complete search history.

(56) References Cited

U.S. PATENT DOCUMENTS

| 2016/0037550 A1* | 2/2016 | Barabell | H04B 17/318 |
|---|---|---|---|
| | | | 455/450 |
| 2018/0083746 A1* | 3/2018 | Kang | H04L 5/0007 |

* cited by examiner

*Primary Examiner* — Philip Sobutka
(74) *Attorney, Agent, or Firm* — Birch, Stewart, Kolasch & Birch, LLP

(57) ABSTRACT

In an aspect of the present invention, provided is a method for receiving an uplink signal by a base station (BS) in a wireless communication system where a reference signal is not used, including: obtaining information bits by demodulating and decoding a signal of a first user equipment (UE) that is modulated through a differential modulation scheme; estimating a channel between the first UE and the BS using the information bits; and performing successive interference cancellation (SIC) using the signal of the first UE restored through the channel estimation results and the information bits. In this case, the BS may estimate the channel between the first UE and the BS by assuming that an $N^{th}$ modulation symbol among modulation symbols of the information bits modulated through the differential modulation scheme is fixed to a predetermined constellation point.

14 Claims, 12 Drawing Sheets

METHOD AND DEVICE FOR RECEIVING UPLINK SIGNAL USING DIFFERENTIAL MODULATION SCHEME WITH INTERFERENCE CANCELLATION AND CHANNEL ESTIMATION

This application claims the benefit of U.S. Provisional Application No. 62/457,110 filed on Feb. 9, 2017, which is hereby incorporated in its entirety by reference as if fully set forth herein.

BACKGROUND OF THE INVENTION

Field of the Invention

The present invention relates to a wireless communication system, and more particularly, to a method for transmitting or receiving an uplink signal based on a non-orthogonal multiple access (NOMA) scheme and apparatus therefor.

Discussion of the Related Art

As a number of communication devices have required much higher communication capacity, scenarios for the next generation communication system (e.g., 5G or new RAT) have been discussed in recent years. For example, Enhanced Mobile BroadBand (eMBB), Ultra-reliable Machine-Type Communications (uMTC), and Massive Machine-Type Communications (mMTC) are included in the scenarios. The eMBB corresponds to a next generation mobile communication scenario characterized by high spectrum efficiency, high user experienced data rate, high peak data rate, and the like. The uMTC corresponds to a next generation mobile communication scenario characterized by ultra-high reliability, ultra-low latency, ultra-high availability, and the like and for example, V2X, emergency service, remote control, etc. are included. The mMTC corresponds to a next generation mobile communication scenario characterized by low cost, low energy, short packet, massive connectivity, and the like and for example, the mMTC may include IoT.

FIG. 1 illustrates a relationship between core performance requirements for 5G, which are proposed in IMT 2020, and 5G performance requirements for each service scenario. In particular, in the case of the uMTC service, the over the air (OTA) latency requirement is extremely restricted and high mobility and reliability is required (e.g., OTA Latency: <1 ms, Mobility: >500 km/h, and BLER: <$10^{-6}$).

For the next generation wireless communication, new radio access technologies (RATs) in which the eMBB, mMTC, URLCC, and the like are considered have been discussed.

SUMMARY OF THE INVENTION

Technical Problems

The technical task of the present invention is to provide a method for transmitting and receiving an uplink signal without any reference signal based on a non-orthogonal multiple access (NOMA) scheme and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided is a method for receiving an uplink signal by a base station (BS) in a wireless communication system where a reference signal is not used, including: obtaining information bits by demodulating and decoding a signal of a first user equipment (UE) that is modulated through a differential modulation scheme; estimating a channel between the first UE and the BS using the information bits; and performing successive interference cancellation (SIC) using the signal of the first UE restored through the channel estimation results and the information bits. In this case, the BS may estimate the channel between the first UE and the BS by assuming that an $N^{th}$ modulation symbol among modulation symbols of the information bits modulated through the differential modulation scheme is fixed to a predetermined constellation point.

In another aspect of the present invention, provided is a base station (BS) for receiving an uplink signal in a wireless communication system where a reference signal is not used, including: a receiver configured to receive a signal of a first user equipment (UE) that is modulated through a differential modulation scheme; and a processor configured to obtain information bits by demodulating and decoding the signal of the first UE, estimate a channel between the first UE and the BS using the information bits, and perform successive interference cancellation (SIC) using the signal of the first UE restored through the channel estimation results and the information bits. In this case, the processor may be configured to estimate the channel between the first UE and the BS by assuming that an $N^{th}$ modulation symbol among modulation symbols of the information bits modulated through the differential modulation scheme is fixed to a predetermined constellation point.

The BS may receive a signal where the signal of the first UE and a signal of a second UE are superposed according to a non-orthogonal multiple access (NOMA) scheme and obtain the signal of the second UE from the received signal by performing the SIC.

The BS may re-modulate the information bits such that the $N^{th}$ modulation symbol has a value corresponding to the predetermined constellation point and estimate the channel between the first UE and the BS based on modulation symbols obtained through the re-modulation and modulation symbols received from the first UE.

The BS may transmit the value corresponding to the predetermined constellation point to be used as the $N^{th}$ modulation symbol. In this case, the BS may transmit the value corresponding to the predetermined constellation point either through RRC signaling or in a broadcasting manner.

In this case, N may have a value of 1.

A location of a resource where the $N^{th}$ modulation symbol to be mapped may be predefined between the first UE and the BS.

The location of the resource where the $N^{th}$ modulation symbol to be mapped may be specific to the first UE.

Advantageous Effects

According to embodiments of the present invention, when an uplink signal is modulated based on a differential modulation scheme in a wireless communication system, a reference modulation symbol can be fixed at a predetermined constellation point. Therefore, a base station can receive signals transmitted from multiple user equipments based on a non-orthogonal multiple access (NOMA) scheme by performing channel estimation without any reference signal.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

Prior to discussing the New RAT, a brief overview of the 3GPP LTE/LTE-A system is presented. The following description of 3GPP LTE/LTE-A can be referenced to help understand New RAT, and some LTE/LTE-A operations and configurations that do not conflict with the design of New RAT may also apply to New RAT. New RAT may be referred to as 5G mobile communication for convenience.

3GPP LTE/LTE-A SYSTEM

Figure 1:
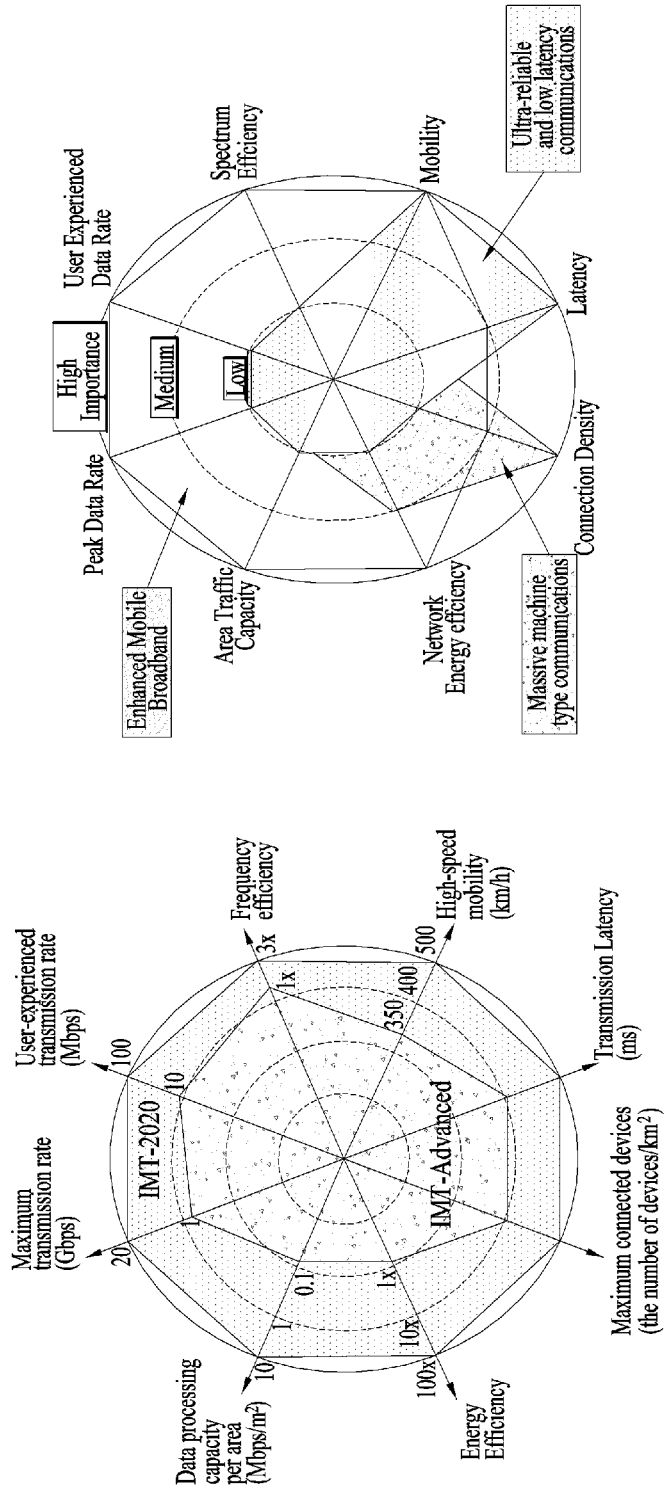
FIG. 1 illustrates 5G service scenarios and performance requirements thereof.
Figure 2:
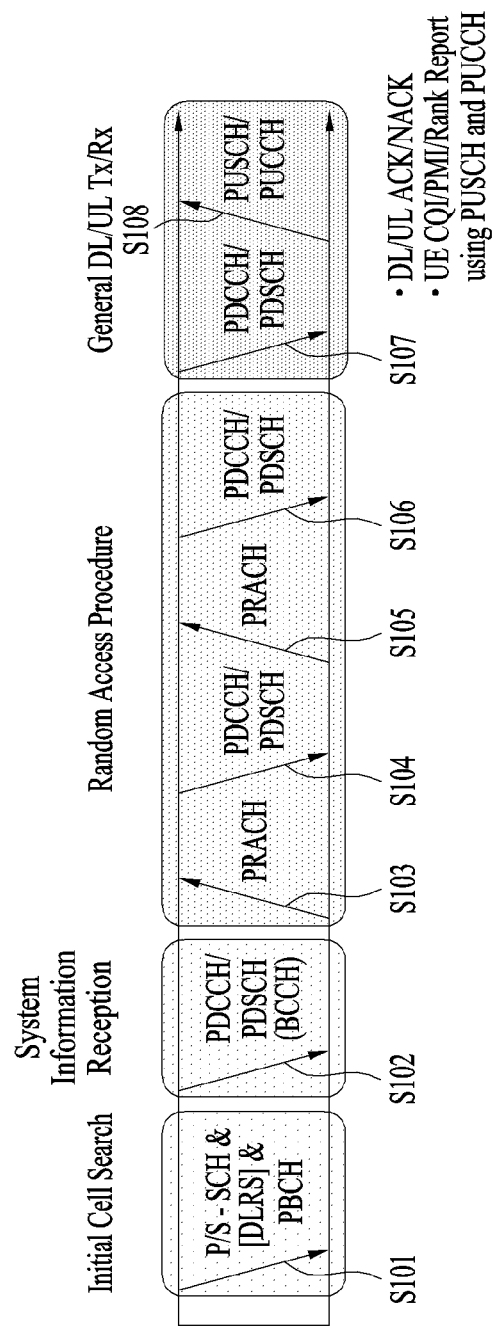
FIG. 2 illustrates physical channels used in the 3GPP LTE/LTE-A system and a general method for transmitting a signal using the same.

FIG. 2 is a diagram for explaining an example of physical channels used for 3GPP LTE system and a general signal transmission method using the same.

Referring to FIG. 2, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel (PBCH) from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 3:
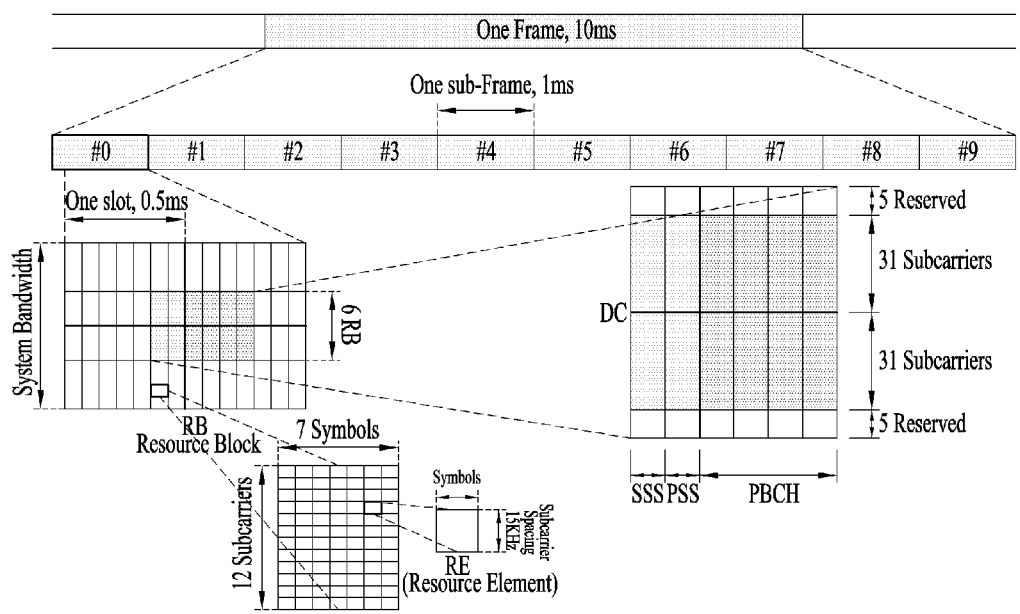
FIG. 3 illustrates a radio frame structure of the 3GPP LTE/LTE-A system.

FIG. 3 is a diagram for explaining an example of a structure of a radio frame of 3GPP LTE/LTE-A system. Referring to FIG. 3, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference. When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel). That is, in the normal CP case, 1 RB is defined by 7 OFDM symbols and 12 subcarriers with 15 kHz spacing.

The center frequency 6 RB transmits a primary synchronization signal (PSS), a secondary synchronization signal (SSS) for synchronization, and a physical broadcast channel (PBCH) for system information transmission. The above-described frame structure, and locations of signal and channels can be changed according to normal/extended CP, TDD/FDD.

Figure 4:
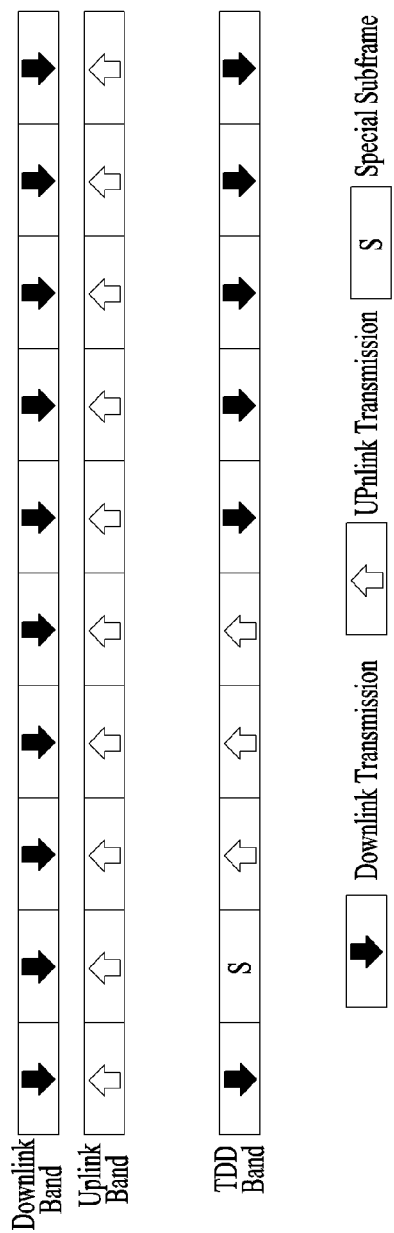
FIG. 4 illustrates FDD and TDD of the 3GPP LTE/LTE-A system.

FIG. 4 illustrates FDD and TDD in an LTE/LTE-A system. Referring to FIG. 4, in the case of FDD, the downlink and uplink frequency bands are divided. In the case of TDD, the downlink region and the uplink region are divided in a unit of subframe(s) in the same band.

New RAT

According to performance requirements for the new RAT, a subframe needs to be newly designed to satisfy low latency.

[Self-Contained Subframe]

Figure 5:
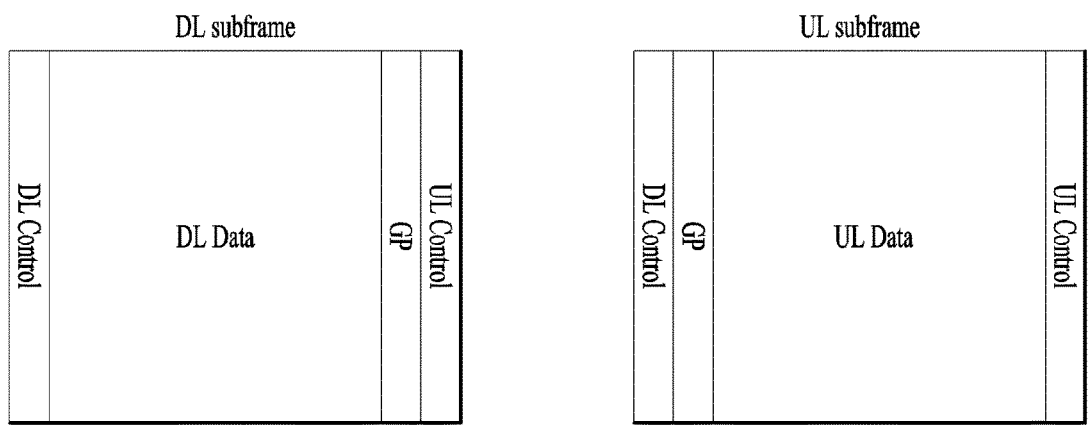
FIG. 5 illustrates a structure of a self-contained subframe according to an embodiment of the present invention.

FIG. 5 illustrates a self-contained subframe proposed for the new RAT. In this specification, the self-contained subframe can be simply referred to as a subframe.

According to a TDD-based self-contained subframe structure, both a resource region for DL and a resource region for UL (e.g., DL and UL control channels) are present in one subframe.

Although the self-contained subframe structure of FIG. 5 shows that a subframe is configured in the following order: DL control region—data region—UL control region, the present invention is not limited thereto. For example, as another self-contained subframe structure, a subframe may be configured in the following order: DL control region—UL control region—data region.

A self-contained subframe can be categorized into a DL self-contained subframe and a UL self-contained subframe according to a data transfer direction of the corresponding subframe.

This self-contained subframe structure requires a time gap that allows a base station (BS) and a user equipment (UE) to switch from transmission mode to reception mode and vice versa. To this end, at least one OFDM symbol on which DL to UL switching is performed is set as a guard period (GP) in the self-contained subframe structure. That is, the GP is located at a point where DL to UL switching is performed. For example, in a DL subframe, the GP is located between a DL data region and a UL control region and in a UL subframe, the GP is located between a DL control region and a UL data region.

Meanwhile, one subframe can be defined as a predetermined time duration. For example, in the new RAT (NR), one subframe can be fixed to a time duration of 1 ms. In this case, since one symbol length is determined according to subcarrier spacing, the number of symbols included in one subframe can also be determined according to the subcarrier spacing. For example, if the subcarrier spacing is 15 kHz, one subframe may include 14 symbols. However, if the subcarrier spacing doubles, i.e., becomes 30 kHz, the duration of one symbol decreases in half and thus, one subframe may include a total of 28 symbols. The subcarrier spacing may become $15\text{ kHz}*2^n$ and the number of symbols included in one subframe may become $14*2^n$. In this case, n is an integer such as 0, 1, 2, . . . , but it does not need to be a positive integer. If n is a negative integer, for example, −1, one subframe may include a total of 7 symbols.

[NoMA Scheme with Differential Modulation]

The new RAT (NR) system is designed to support massive connectivity in a massive machine type communication (mMTC) scenario. For example, the system needs to be designed to provide services to $10^6$ UEs. In addition, in the case of the mMTC, the corresponding UEs generally have sporadic traffic and small packets.

If this mMTC service is supported based on scheduling, it may be inefficient in that signaling overhead for the scheduling is increased. For example, when a UE intends to transmit a small packet (e.g., 20 bytes) based on scheduling, the UE needs to transmit a scheduling request (SR), receive a first UL grant in response to the SR, transmit a buffer status report (BSR) based on the first UL grant, and receive a second UL grant in response to the BSR in order to the small 20-byte packet. In other words, when the 20-byte packet is transmitted, it may cause signaling overhead much greater than the packet.

Therefore, a grant-free or contention-based transmission scheme in which a UE can perform transmission without a UL grant from a BS needs to be developed.

In another aspect of supporting the massive connectivity, a non-orthogonal multiple access (NOMA) scheme, which is different from the conventional OFDMA scheme, can be used. The NOMA scheme means a multiple access scheme capable of allowing multiple users to transmit their own data on the same resources in a non-orthogonal manner. For example, in the NOMA system, multi-user data is transmitted on the same time-frequency resources in an overlapping manner and thus, it can support improved capacity compared to the OFDMA system. For this NOMA system, high complexity of multi-user detection (MUD) needs to be performed at a receiver. The NOMA-related technology, which has been considered as a core technology for the next generation 5G system, can be sub-divided into: MUST where users are identified based on their power levels; sparse code multiple access (SCMA) where codebook-based modulation is utilized; and interleave division multiple access (IDMA) where a user-specific interleaver is used.

Meanwhile, the LTE UL subframe structure has significantly large DMRS overhead. Specifically, since the LTE system uses two symbols among fourteen symbols as a DMRS, an RS has about 14 percentage of overhead in terms of entire resources.

In the NR system, if a receiver is able to perform demodulation without an RS, a transmitter can obtain a gain using corresponding reserved resources to improve spectral efficiency or to increase a coding rate. That is, by doing so, it is possible to support the massive connectivity more efficiently.

For the demodulation without an RS, it is possible to consider non-coherent detection without channel estimation like differential BPSK (DPBSK) or differential QPSK (DQPSK). However, in the case of the NOMA, a receiver performs successive interference cancellation (SIC) to cancel symbols for another UE from an entire signal. In this case, the receiver should know channel estimation information of the UE corresponding to the cancellation target to correctly acquire a desired UE signal. For example, if first and second UEs respectively transmit signals on the same resource based on the NOMA scheme and a base station desires to obtain a signal from the first UE of the transmitted signals, the base station needs to eliminate the signal from the second UE. In this case, if the BS does not know a channel state between the second UE and the BS, the BS may have a difficulty in extracting the signal transmitted from the second UE even though the BS knows the signal from the second UE. The reason for this is that distortion and noise occurs while the signal transmitted from the second UE passes through a channel. On the contrary, if the BS knows the channel state between the second UE and the BS, the BS can extract the signal from the first UE by estimating the signal from the second UE that passes through the known channel and then cancelling the estimated signal from the entire signal.

Hence, the NR system requires a new method for not only using the NOMA scheme but also performing channel estimation without an RS. Hereinafter, a description will be given of new methods for applying differential modulation to NOMA. Through the proposed methods, support for the massive connectivity can be improved.

Proposal 1

For example, all UEs can map a first modulated symbol to a fixed constellation point irrespective of coded bits. In addition, the fixed constellation point for the first modulated symbol may be determined in advance between a BS (e.g., receiver) and a UE (e.g., transmitter).

Although in this embodiment, it is assumed that the constellation point of the first modulated symbol is predefined for convenience of description, the invention is not limited thereto. For example, an $N^{th}$ constellation point may be predefined between the BS and UE and at least one constellation point may be defined therebetween.

Meanwhile, in the case of the conventional DPBSK, which constellation point is used for mapping of the first modulated symbol is not important in terms of transmission and reception operation. This is because a receiver can demodulate a signal if the receiver knows a phase difference between consecutive symbols.

However, in the case of the NOMA, a receiver should perform channel estimation for SIC as described above. That is, the receiver should accurately know what is the first modulated symbol to perform channel estimation without an RS.

Figure 6:
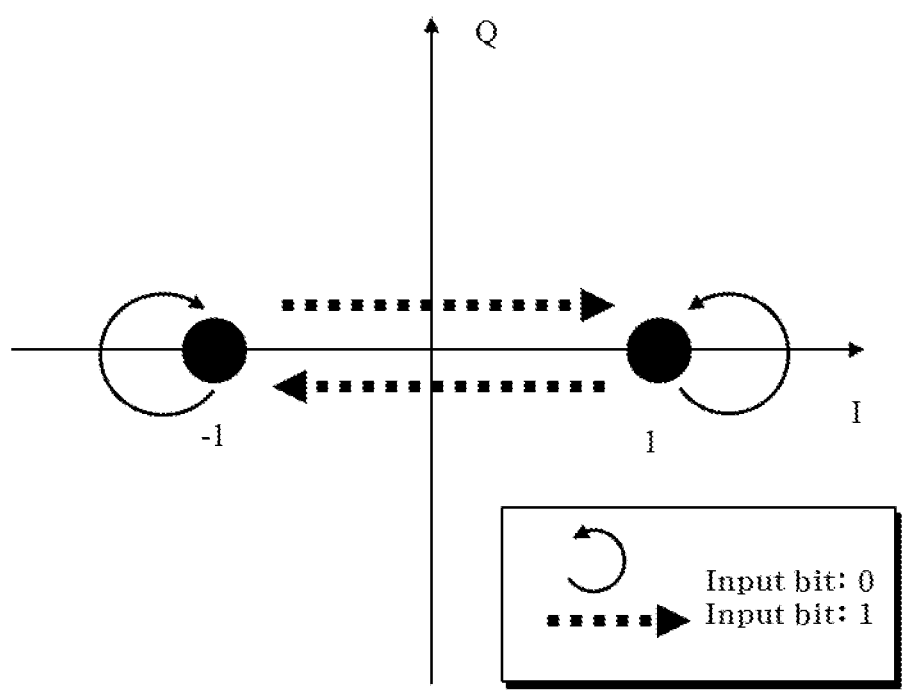
FIG. 6 illustrates an example of DBPSK modulation.

FIG. 6 illustrates an example of DBPSK modulation.

Referring to FIG. 6, when the DBPSK modulation is performed on an input bit of 0, it has the same value as that of the previous modulation symbol and when the DBPSK modulation is performed on an input bit of 1, it has a value obtained by toggling the previous modulation symbol.

Figure 7:
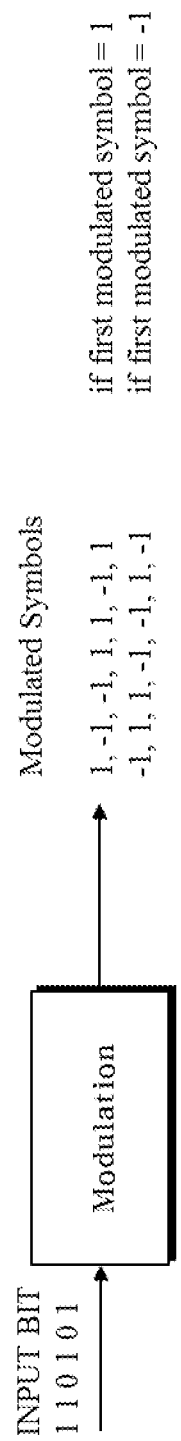
FIG. 7 illustrates a case in which first modulated symbols are set to +1 and −1 in the DBPSK modulation.

FIG. 7 illustrates a case in which first modulated symbols are set to +1 and −1 in the DBPSK modulation.

In the case of the conventional DPBSK, a receiver can correctly perform demodulation irrespective of whether the first modulated symbol is +1 or −1. The reason for this is that the receiver performs the demodulation using only a phase difference between consecutive symbols.

On the other hand, in the case of the NOMA, channel estimation is required for SIC and a receiver can perform channel estimation only if the receiver knows what is the first modulated symbol. In other words, when the receiver converts decoded bits into modulated symbols again, the decoded bits may be converted into different modulated symbols depending on a reference symbol (e.g., the first modulated symbol). For example, when decoded bits of UE 1 are 110101, the decoded bits may be converted into different modulated symbols according to whether the reference symbol is +1 or −1. If a BS determines the reference symbol as +1, the modulated symbols become {1,−1,−1,1,1,−1,1}. The BS can estimate a channel between the UE 1 and BS from an entire signal using at least part of the generated modulated symbols {1,−1,−1,1,1,−1,1}. For example, the BS may generate a known signal using the generated modulated symbols and then use the known signal as the conventional RS in order to estimate the channel between the UE 1 and BS. Meanwhile, if the BS determines the reference symbol as −1, the modulated symbols become {−1,1,1,−1,−1,1,−1} and thus, a different type of known signal is generated.

For accurate channel estimation, this ambiguity should be eliminated and to this end, both of the transmitting and receiving ends should know the first modulated symbol. In other words, the first modulated symbol should be defined in advance between the UE and BS.

Although the DBPSK is assumed for convenience of description, the predefinition of the first modulated symbol can be equally applied to other differential modulation schemes. For example, in the case of the DQPSK, the first modulated symbol can be fixed as one of 1+1j, 1−1j, −1+1j, and −1−1j.

Information on the first modulated symbol can be predefined. Alternatively, it can be broadcasted through a common control channel or a broadcast channel or determined between transmitting and receiving ends through RRC or higher layer signaling.

In addition, to improve the channel estimation performance, each UE may puncture a specific symbol and then perform transmission. By doing so, the BS can measure power of the remaining UEs except the corresponding UE in the specific symbol, i.e., interference power. Moreover, a puncturing pattern can be configured/defined in advance and a linkage between the puncturing pattern and a NOMA sequence may be established. Further, the puncturing pattern can be broadcasted through the common control channel or broadcast channel or determined between the transmitting and receiving ends through the RRC or higher layer signaling.

Alternatively, a special symbol capable of carrying signals for a single UE may be defined. Through the special symbol, the BS can measure power of the corresponding UE. A location of the corresponding special symbol can be configured/defined in advance and a linkage between the special symbol location and the NOMA sequence may be established. Further, the special symbol location can be broadcasted through the common control channel or broadcast channel or determined between the transmitting and receiving ends through the RRC or higher layer signaling.

Proposal 2

According to an embodiment of the present invention, a location of the resource where the first modulated symbol is mapped can be predefined between the UE and BS. For example, a location to which the modulated symbol is mapped in a resource grid may be predefined. Thus, the BS can perform differential demodulation and channel estimation with reference to the predefined location of the modulated symbol.

That is, according to the differential modulation scheme, the BS should know the location of the first reference modulated symbol. In other words, the BS should know a channel state of the RE corresponding to the first modulated symbol and can estimate channels for other REs using the channel state of the RE.

Figure 8:
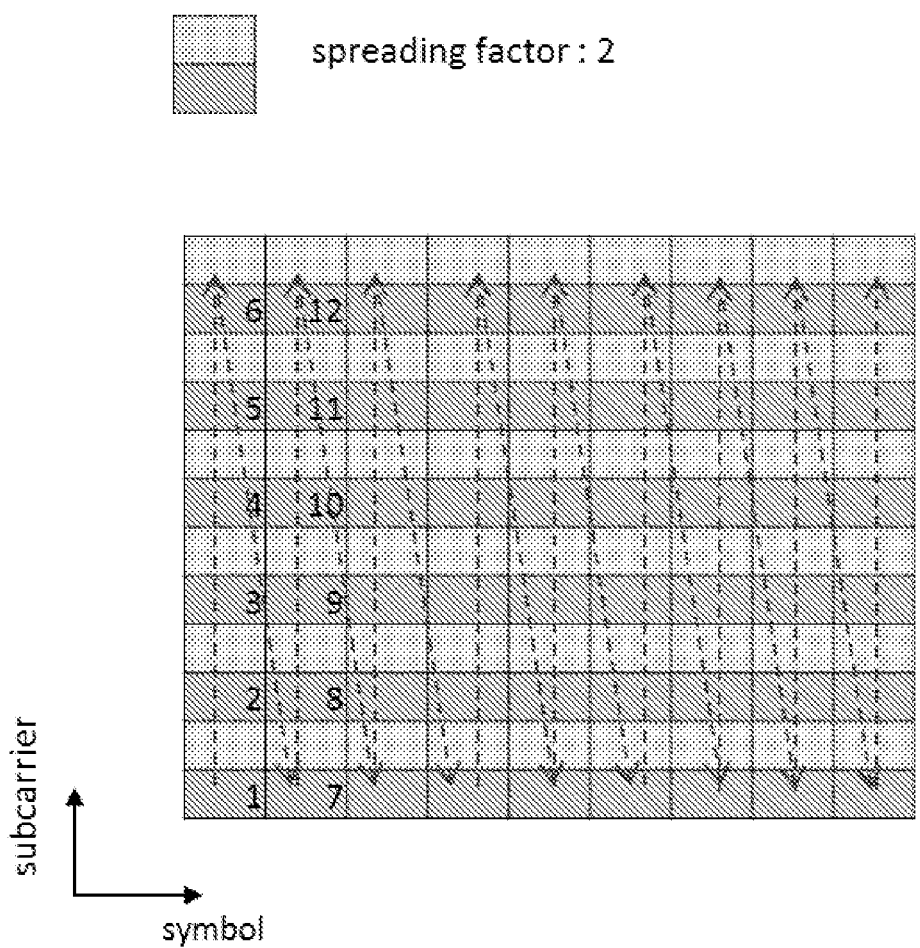
FIG. 8 illustrates an example of resource mapping for modulated symbols.

FIG. 8 illustrates an example of resource mapping for modulated symbols.

Although in the example of FIG. 8, a spreading factor of spreading-based NOMA is assumed to be 2, the present invention is not limited thereto.

Referring to FIG. 8, the first modulated symbol is mapped starting from an RE corresponding to the first symbol in the symbol domain (i.e., time domain) and the lowest subcarrier in the frequency domain in the transmission resource region. Since the SF is set to 2 (SF=2), one modulated symbol is mapped across two REs. Although frequency first mapping is assumed in the present example, time first mapping may be used.

Figure 9:
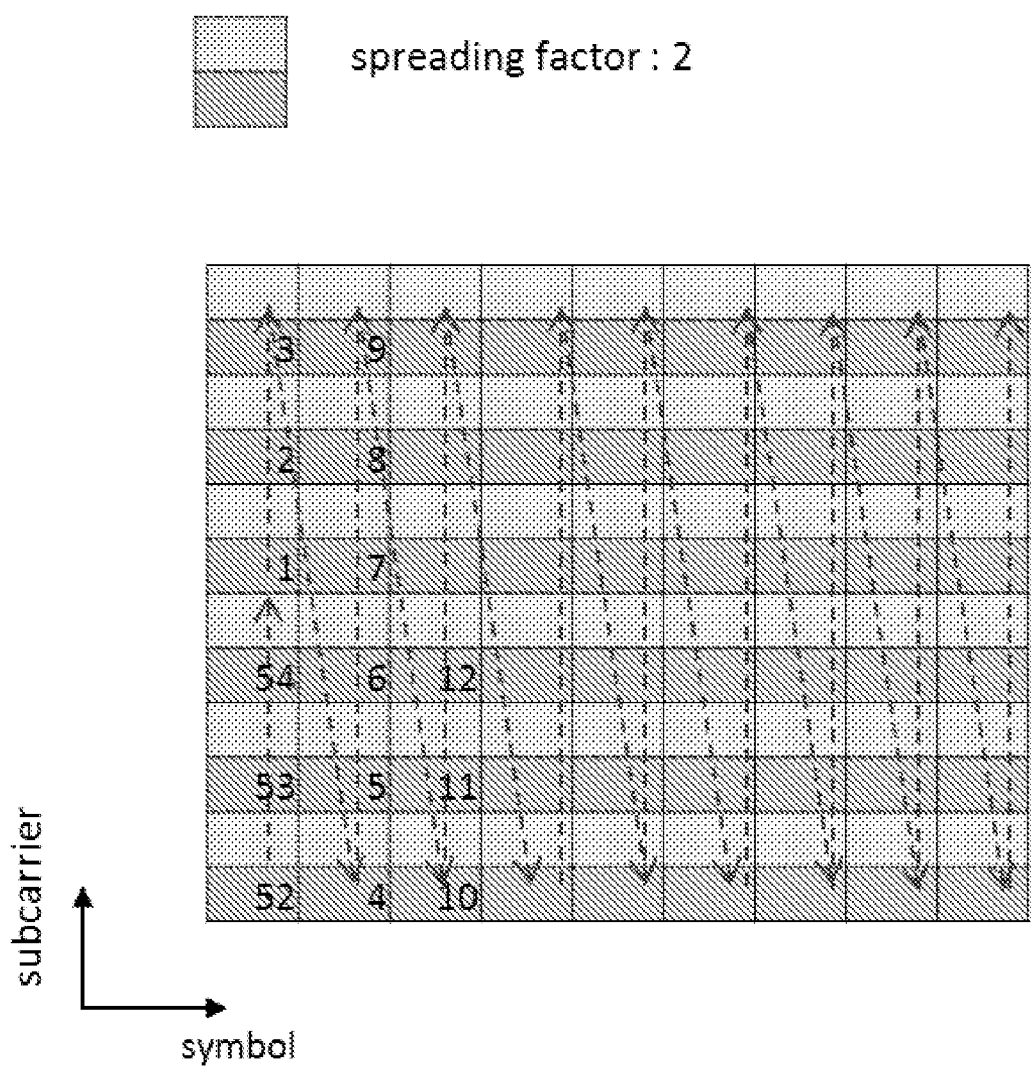
FIG. 9 illustrates another example of resource mapping for modulated symbols.

FIG. 9 illustrates another example of resource mapping for modulated symbols.

In FIG. 9, the first modulated symbol is mapped to another subcarrier rather than the lowest subcarrier unlike FIG. 8.

As described above, UEs may use a different location in mapping the first modulated symbol. That is, the location of the RE(s) where the first modulated symbol is mapped may be previously configured or defined in a UE-specific manner.

Further, a UE may allocate higher power for the first modulated symbol compared to power for other symbols and thus, the BS may perform the channel estimation more robustly. For example, the power for the first modulated symbol can be boosted by 3 dB. In addition, this power allocation may be predefined between the UE and BS.

The proposal 2 can be equally applied not only when the SF has a different value but also when the time first mapping is used instead of the frequency first mapping.

Proposal 3

The BS restores UE 1's information bits through modulation and decoding and then obtains coded bits by encoding the restored UE 1's information bits. Subsequently, the BS performs channel estimation for the UE 1 based on the coded bits. Thereafter, the BS performs successive interference cancellation (SIC) based on the channel estimation results and coded bits. By doing so, the BS can obtain a signal transmitted from UE 2 through the SIC.

Figure 10:
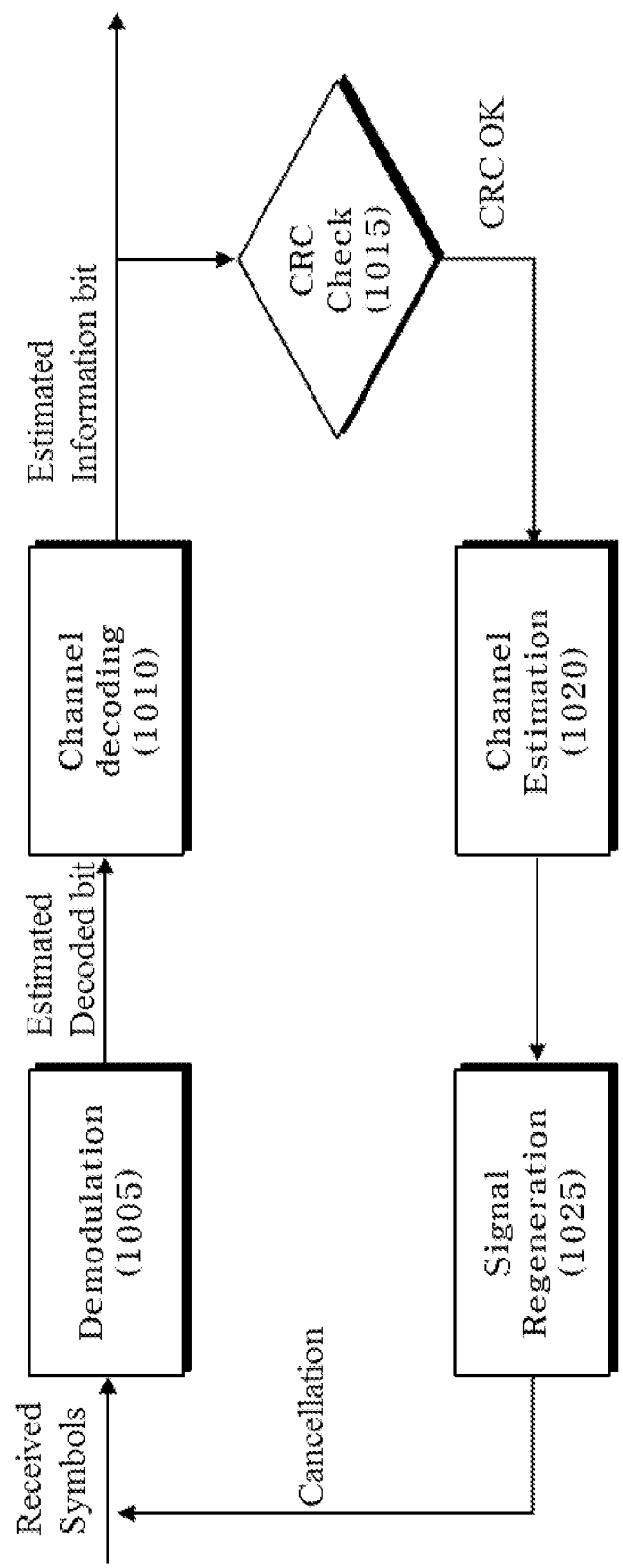
FIG. 10 illustrates an example of a receiver structure for performing SIC.

FIG. 10 illustrates an example of a receiver structure for performing SIC. The receiver of FIG. 10 may be included in the BS.

First, it is assumed that the BS receives signals from K UEs and Rx power is sequentially decreased in order from UE 1 to UE K.

The BS performs demodulation 1005 and decoding 1010 on a signal from the UE 1 and then performs CRC check 1015 on UE 1's information bits obtained from decoding. If the information bits pass through the CRC check, the BS may perform channel estimation 1020 for the UE 1 by performing re-encoding and modulation on the UE 1's information bits.

Thereafter, the BS performs signal regeneration (restoration) 1025 on the UE 1's signal based on the channel estimated from the UE 1's signal. By cancelling the restored UE 1's signal from the received signals, the BS can obtain signals from the remaining UEs.

Next, the BS performs demodulation 1005 and decoding 1010 on a signal from the UE 2 and then performs CRC check 1015 on UE 2's information bits obtained from decoding. If the information bits pass through the CRC check, the BS may perform channel estimation 1020 for the UE 2 by performing re-encoding and modulation on the UE 2's information bits. Thereafter, the BS cancels the UE 2's signal from the received signals based on the estimated channel and re-encoded signal.

The BS may repeat the same process until the UE K.

The BS can perform the SIC using the estimated channel and restored data (e.g., modulated symbol).

The BS can successively operate based on the aforementioned receiver structure and thus, reception performance can be improved.

Although UL transmission is assumed for convenience of description, the proposals can be applied to DL. In addition, the present invention can be applied to various scenarios including D2D, V2V, V2X, etc.

Figure 11:
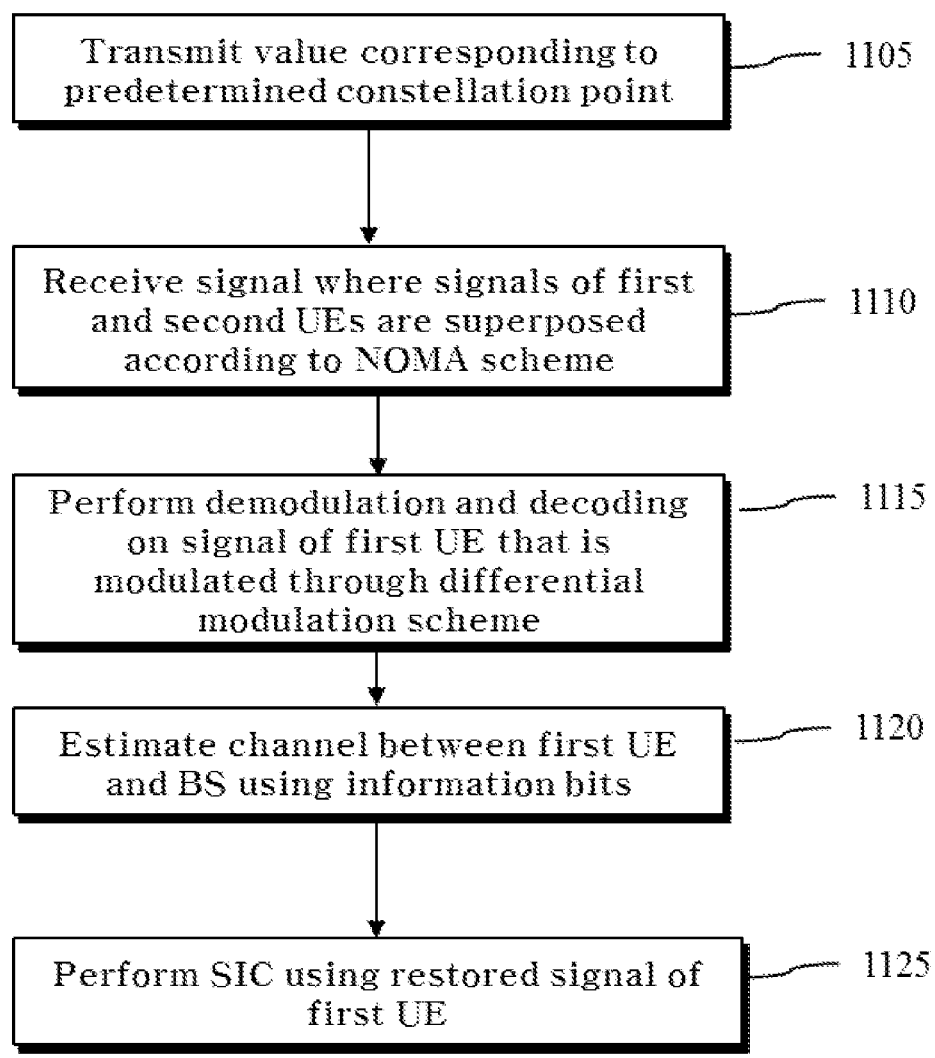
FIG. 11 illustrates a method for transmitting and receiving a signal according to an embodiment of the present invention.

FIG. 11 illustrates a method for transmitting and receiving a signal according to an embodiment of the present invention. To avoid redundant description, the already mentioned features shall be omitted in the following description.

Referring to FIG. 11, a BS can transmit a value corresponding to a predetermined constellation point to be fixed as an $N^{th}$ modulation symbol in a differential modulation scheme [1105]. The BS may transmit the value corresponding to the predetermined constellation point through RRC signaling or in a broadcasting manner.

The BS receives a signal where signals of first and second UEs are superposed according to a non-orthogonal multiple access (NOMA) scheme [1110].

The BS performs demodulation and decoding on the first UE's signal that is modulated through the differential modulation scheme [1115].

The BS estimates a channel between the first UE and BS using information bits obtained by demodulating and decoding the first UE's signal [1120]. The BS can estimate the channel between the first UE and BS by assuming that the $N^{th}$ modulation symbol among modulation symbols of the information bits modulated through the differential modulation scheme is fixed to the predetermined constellation point.

The BS performs successive interference cancellation (SIC) using the first UE's signal restored through the channel estimation results and information bits [1125]. The BS can obtain the second UE's signal by performing the SIC.

The BS re-modulates the information bits such that the $N^{th}$ modulation symbol has the value corresponding to the predetermined constellation point. Thereafter, the BS can estimate the channel between the first UE and BS based on modulation symbols obtained through the re-modulation and modulation symbols received from the first UE.

In this case, N may be 1.

A location of a resource where the $N^{th}$ modulation symbol to be mapped may be defined in advance between the first UE and BS. Further, the location of the resource where the $N^{th}$ modulation symbol will be mapped may be specific to the first UE (i.e., the first UE specific location).

Figure 12:
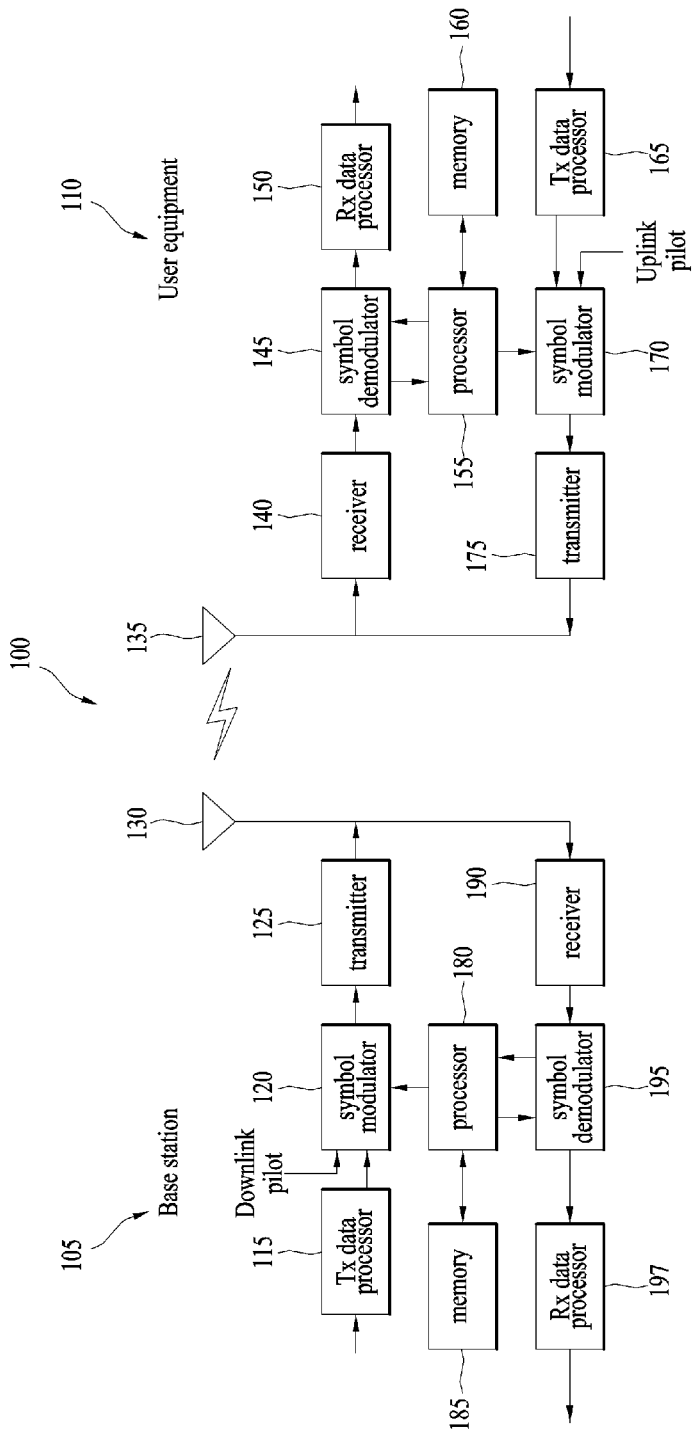
FIG. 12 illustrates a user equipment (UE) and a base station (BS) according to an embodiment of the present invention.

FIG. 12 is a block diagram illustrating a base station (BS) 105 and a user equipment (UE) 110 for use in a wireless communication system 100 according to the present invention.

Although FIG. 12 shows one UE 105 and one UE 110 (including a D2D UE) for brief description of the wireless communication system 100, it should be noted that the wireless communication system 100 may further include one or more BSs and/or one or more UEs.

Referring to FIG. 13, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for receiving an uplink signal by a base station (BS) in a wireless communication system where a reference signal is not used, the method comprising:
    obtaining information bits by demodulating and decoding a signal of a first user equipment (UE) that is modulated through a differential modulation scheme;
    estimating a channel between the first UE and the BS based on the information bits; and
    performing successive interference cancellation (SIC) based on the signal of the first UE which is restored through results of the channel estimation and the information bits,
    wherein the BS estimates the channel between the first UE and the BS by assuming that an Nth modulation symbol among modulation symbols of the information bits modulated through the differential modulation scheme is fixed to a predetermined constellation point, where N is an integer, and
    wherein estimating the channel comprises:
        re-modulating the information bits such that the Nth modulation symbol has a value related with the predetermined constellation point; and
        estimating the channel between the first UE and the BS based on modulation symbols obtained through the re-modulation and modulation symbols received from the first UE.

2. The method of claim 1, further comprising:
    receiving a signal where the signal of the first UE and a signal of a second UE are superposed according to a non-orthogonal multiple access (NOMA) scheme,
    wherein the BS obtains the signal of the second UE from the received signal by performing the SIC.

3. The method of claim 1, further comprising:
    transmitting the value related with to the predetermined constellation point to be used as the Nth modulation symbol.

4. The method of claim 3, wherein the BS transmits the value related with the predetermined constellation point through radio resource control (RRC) signaling or in a broadcasting manner.

5. The method of claim 1, wherein N has a value of 1.

6. The method of claim 1, wherein a location of a resource where the Nth modulation symbol to be mapped is predefined between the first UE and the BS.

7. The method of claim 6, wherein the location of the resource where the Nth modulation symbol to be mapped is specific to the first UE.

8. A base station (BS) for receiving an uplink signal in a wireless communication system where a reference signal is not used, the BS comprising:
    a receiver; and
    a processor configured to:
        control the receiver to receive a signal of a first user equipment (UE) that is modulated through a differential modulation scheme, and
        control the receiver to obtain information bits by demodulating and decoding the signal of the first UE,
        estimate a channel between the first UE and the BS based on the information bits, and
        perform successive interference cancellation (SIC) based on the signal of the first UE which is restored through results of the channel estimation and the information bits,
    wherein the processor is configured to estimate the channel between the first UE and the BS by assuming that an Nth modulation symbol among modulation symbols of the information bits modulated through the differential modulation scheme is fixed to a predetermined constellation point, where N is an integer, and
    wherein the processor is configured to re-modulate the information bits such that the Nth modulation symbol has a value related with the predetermined constellation point and estimate the channel between the first UE and the BS based on modulation symbols obtained through the re-modulation and modulation symbols received from the first UE.

9. The BS of claim 8, wherein the processor is configured to control the receiver to receive a signal where the signal of the first UE and a signal of a second UE are superposed according to a non-orthogonal multiple access (NOMA)

scheme and is configured to obtain the signal of the second UE from the received signal by performing the SIC.

10. The BS of claim 8, further comprising:
a transmitter configured to transmit the value related with the predetermined constellation point to be used as the Nth modulation symbol.

11. The BS of claim 10, wherein the value related with the predetermined constellation point is transmitted either through radio resource control (RRC) signaling or in a broadcasting manner.

12. The BS of claim 8, wherein N has a value of 1.

13. The BS of claim 8, wherein a location of a resource where the Nth modulation symbol to be mapped is predefined between the first UE and the BS.

14. The BS of claim 13, wherein the location of the resource where the Nth modulation symbol to be mapped is specific to the first UE.

* * * * *